(12) United States Patent
Sébire

(10) Patent No.: US 8,014,365 B2
(45) Date of Patent: Sep. 6, 2011

(54) METHOD AND A DEVICE FOR TRANSFERRING SIGNALLING INFORMATION IN A TDMA BASED SYSTEM

(75) Inventor: Benoist Sébire, Tokyo (JP)

(73) Assignee: Nokia Corporation, Espoo (FI)

( * ) Notice: Subject to any disclaimer, the term of this patent is extended or adjusted under 35 U.S.C. 154(b) by 1078 days.

(21) Appl. No.: 11/578,731

(22) PCT Filed: Apr. 19, 2004

(86) PCT No.: PCT/FI2004/000238
§ 371 (c)(1),
(2), (4) Date: Jul. 23, 2007

(87) PCT Pub. No.: WO2005/101871
PCT Pub. Date: Oct. 27, 2005

(65) Prior Publication Data
US 2007/0258413 A1     Nov. 8, 2007

(51) Int. Cl.
*H04J 3/00*          (2006.01)
(52) U.S. Cl. ........ 370/337; 370/321; 370/326; 370/345; 370/336; 370/300; 370/314; 370/498
(58) Field of Classification Search .................. 370/321, 370/326, 345, 337, 336, 300, 314, 498
See application file for complete search history.

(56) References Cited

U.S. PATENT DOCUMENTS

| | | | | |
|---|---|---|---|---|
| 2002/0097695 A1* | 7/2002 | Herrmann | .................... | 370/329 |
| 2004/0152468 A1* | 8/2004 | Sebire | .......................... | 455/450 |
| 2005/0094656 A1* | 5/2005 | Rao et al. | ...................... | 370/431 |
| 2005/0201281 A1* | 9/2005 | Damnjanovic et al. | ....... | 370/230 |
| 2008/0209297 A1* | 8/2008 | Chandra et al. | .............. | 714/748 |

OTHER PUBLICATIONS

3GPP TS 45.002 V6.5.0 (Feb. 2004), 3$^{rd}$ Generation Partnership Project; Technical Specification Group GSM/EDGE Radio Access Network; Multiplexing and multiple access on the radio path (Release 6) 88 pages.

3GPP TS 44.160 V6.3.0 (Feb. 2004), "3$^{rd}$ Generation Partnership Project; Technical Specification Group GSM/EDGE Radio Access Network; General Packet Radio Service (GPRS); Mobile Station (MS)- Base Station System (BSS) interface; Radio Link Control/Medium Access Control (RLC/MAC) protocol Iu mode (Release 6)", 118 pages.

(Continued)

*Primary Examiner* — Kwasi Karikari
(74) *Attorney, Agent, or Firm* — Harrington & Smith

(57) ABSTRACT

A method and a device for transferring signalling information in a TDMA based system. Temporal alignment of values for a retransmission number parameter (R) with the TDMA frame structure is determined on the basis of which a first radio packet to be sent in a number of first TDMA frames is encoded by using a certain first value for the parameter and a second radio packet to be sent in a number of second TDMA frames is encoded by using a certain second value for the parameter. The first and second radio packets are transmitted to the recipient that adheres to the same temporal alignment rules and can thus properly decode both the packets. The solution can be utilized especially in GERAN radio access network with FLO (Flexible Layer One) for transferring signalling information on half-rate channels.

34 Claims, 7 Drawing Sheets

OTHER PUBLICATIONS

3GPP TS 44.118 V6.1.0 (Feb. 2004), 3$^{rd}$ Generation Partnership Project; Technical Specification Group GSM/EDGE Radio Access Network; Mobile Radio Interface layer 3 Specification; Radio Resource Control (RRC) protocol; lu mode (Release 6), 345 pages.

3GPP TS 45.003 V6.2.0 (Feb. 2004) "3$^{rd}$ Generation Partnership Project; Technical Specification Group GSM/EDGE Radio Access Network; Channel Coding (Release 6)" 197 pages.

3GPP TR 45.902, V6.4.0 (Feb. 2004), "3$^{rd}$ Generation Partnership Project; Technical Specification Group GSM/EDGE Radio Access Network; Flexible Layer One (Release 6)", 35 pgs.

3GPP TR 45.902, V6.5.0 (Apr. 2004), "3$^{rd}$ Generation Partnership Project; Technical specification Group GSM/EDGE Radio Access Network; Flexible Layer One (Release 6)", 35 pgs.

\* cited by examiner

| L1 (ms) | 0 | 4,62 | 9,23 | 13,8 | 18,5 | 23,1 | 27,7 | 32,3 | 36,9 | 41,5 | 46,2 | 50,8 | 55,4 |
|---|---|---|---|---|---|---|---|---|---|---|---|---|---|
| L2 (ms) | 0 | 5 | 10 | 15 | 20 | 25 | 30 | 35 | 40 | 45 | 50 | 55 | |
| TDMA Frame | 0 | 1 | 2 | 3 | 4 | 5 | 6 | 7 | 8 | 9 | 10 | 11 | 12 |
| FLO/H #0 | ■ | | ■ | | ■ | ■ | | ■ | | ■ | | | |
| FLO/H #1 | | ■ | | ■ | | ■ | ■ | | ■ | | ■ | | |
| R | 0 | | | | 1 | | | | 0 | | | | |
| FLO/H #0 | 1 | | 1 | | 2 | | 2 | | X | | X | ... | |
| transmit | X | | X | | 1 | | 1 | | 2 | | 2 | ... | |

Comments:
- TX: First signalling transport block (#1) with R = 0
- TX: Second signalling transport block (#2) with R=1
- RX: First signalling transport block (#1)
- RX: Second signalling transport block (#2)

Figure 4C

METHOD AND A DEVICE FOR TRANSFERRING SIGNALLING INFORMATION IN A TDMA BASED SYSTEM

FIELD OF THE INVENTION

The present invention relates generally to communication systems. In particular the invention concerns GERAN (GSM/EDGE Radio Access Network) radio access network and air interface thereof in which a special type of physical layer called flexible layer one (FLO) is utilized.

BACKGROUND OF THE INVENTION

Modern wireless communication systems such as GSM (Global System for mobile communications) and UMTS (Universal Mobile Telecommunications System) are capable of transferring various types of data over the air interface between the network elements such as a base station and a mobile station (MS). As the general demand for transfer capacity continuously rises due to e.g. new multimedia services coming available, new more efficient techniques have been developed in order to exploit the existing resources to a maximum extent.

A technical report [3GPP TR 45.902 V6.4.0 Technical Specification Group GSM/EDGE, Radio Access Network: Flexible layer One (Rel 6)] discloses a concept of flexible layer one, a new physical layer proposed for the GERAN. The ingenuity of the concept relies on the fact that the configuration of the physical layer including e.g. channel coding and interleaving is specified not until the call set-up. Thus, the support of new services can be handled smoothly without having to specify new coding configuration schemes separately in connection with each release.

Development work of the FLO concept has been provided with somewhat strict requirements. FLO should, for example, support multiplexing of parallel data flows on to a basic physical subchannel and provide optimisation of spectral efficiency through the support of different interleaving depths, unequal error protection/detection, reduced channel coding rate granularity and support of different (8PSK, GMSK etc) modulations. Moreover, the solution shall be future proof and minimize the overhead introduced by the radio protocol stack.

According to the GERAN Release 5 the MAC sublayer (Layer 2 for FLO) handles the mapping between the logical channels (traffic or control) and the basic physical subchannels introduced in [3GPP TS 45.002 V6.5.0 Technical Specification Group GSM/EDGE, Radio Access Network: Multiplexing and multiple access on the radio path (Rel 6)].

In UTRAN (UMTS Radio Access Network), the MAC utilizes so-called Transport Channels TrCH for transferring data flows with given QoS's (Quality of Service) over the air interface. As a result, several transport channels, that are configured at call set-up, can be active at the same time and be multiplexed at the physical layer.

Now, by adopting the idea of FLO, aforesaid flexible transport channels can be utilized in GERAN as well. Accordingly, the physical layer of GERAN may offer one or several transport channels to the MAC sublayer. Each of these transport channels can carry one data flow providing a certain Quality of Service (QoS). A number of transport channels can be multiplexed and sent on the same basic physical subchannel at the same time.

The configuration of a transport channel i.e. the number of input bits, channel coding, interleaving etc. is denoted as a Transport Format (TF). Furthermore, a number of different transport formats can be associated to a single transport channel. The configuration of the transport formats is completely controlled by the RAN (Radio Access Network) and signalled to the MS at call set-up. Correct interpretation of the TF is crucial at the receiving end as well as the transport format defines the utilized configuration for decoding of the data. When configuring a transport format, the RAN can, for example, choose between a number of predefined CRC (Cyclic Redundancy Check) lengths and block lengths.

On transport channels, transport blocks (TB) are exchanged between the MAC sublayer and the physical layer on a transmission time interval (TTI) basis. For each TTI a transport format is chosen and indicated through the transport format indicator (TFIN). In other words, the TFIN tells which transport format to use for that particular transport block on that particular TrCH during that particular TTI. When a transport channel is inactive, the transport format with a transport block size of zero (empty transport format) is selected.

Only a limited number of combinations of the transport formats of the different transport channels are allowed. A valid combination is called a Transport Format Combination (TFC). The set of valid TFCs on a basic physical subchannel is called a Transport Format Combination Set (TFCS). The TFCS is signalled through Calculated Transport Format Combinations (CTFC).

In order to decode a received sequence the receiver needs to know the active TFC for the radio packet. This information is transmitted in the Transport Format Combination Identifier (TFCI) field. Aforesaid field is basically a layer 1 header and has the same function as the stealing bits in GSM. A unique TFCI value is assigned to each of the TFC within a TFCS and upon receipt of a radio packet it is the first element to be decoded by the receiver. By utilizing the decoded TFCI value the transport formats for the different transport channels can be determined and the actual decoding can start.

In case of multislot operation, there shall be one FLO instance for each basic physical subchannel. Each FLO instance is configured independently by Layer 3 and gets an own TFCS as a result. The number of allocated basic physical sub channels depends on the multislot capabilities of the MS.

For the time being the use of FLO is planned to be limited to dedicated channels only, thus maintaining the 26-multiframe structure for which the SACCH (Slow Associated Control Channel) shall be treated as a separate logical channel based on GERAN Release 5.

The concept of transport formats and channels as presented in 3GPP TR 45.902 V6.4.0 Technical Specification Group GSM/EDGE, Radio Access Network; Flexible Layer One (Rel 6) is visualized in FIG. 1 where e.g. coded speech is to be transmitted over FLO. Speech is transferred by using three different modes MODE 1, MODE 2, MODE 3 with different bit rates and an additional comfort noise generation mode CNG MODE. Inside a mode the speech bits have been divided into three different classes represented by three transport channels TrCHA 102, TrCHB 104, and TrCHC 106 on the basis of their varying importance during the speech reconstruction stage, for example. Numbers inside the blocks, see e.g. the block pointed by legend 108, being arbitrary in this example though, indicate the required number of bits in a transport channel and codec mode specific manner. Hence, it can be noticed from the figure that TrCHA contains four transport formats (0, 60, 40, 30), TrCHB three transport formats (0, 20, 40) and TrCHC only two formats (0, 20). Resulting transport format combinations TFC1-TFC4, that refer to transport formats on different channels that can be active at the same time, are depicted with dotted lines in the figure. All these valid combinations constitute the TFCS that is signaled through CTFC. An example of CTFC determination is found in 3GPP TR 45.902 V6.4.0 Technical Specification Group GSM/EDGE, Radio Access Network; Flexible layer One (Rel 6) in addition to techniques applicable in proper TFC selection.

A protocol architecture of FLO in case of Iu mode is depicted in FIG. 2 wherein MAC layer 208 maps either a plurality of logical channels or TBFs (temporary block flows) from RLC entities located in RLC layer 206, said RLC layer 206 receiving data from e.g. PDCP 204 (Packet Data Convergence Protocol) and controlled by RRC (Radio Resource Controller) 202, to physical layer 210. In current specification 3GPP TR 45.902 V6.4.0 Technical Specification Group GSM/EDGE, Radio Access Network; Flexible Layer One (Rel 6) logical channels are used but are presumably to be replaced with the concept of temporary block flows in the future. TBF concept is described in reference 3GPP TS 44.160 V6.3.0 Technical Specification Group GSM/EDGE, General Packet Radio Service (GPRS); Mobile Station (MS) - Base Station System (BSS) interface; Radio Link Control/Medium Access Control (RLC/MAC) protocol Iu mode (Rel 6) in more detail. A dedicated channel (DCH) can be used as a transport channel dedicated to one MS in uplink or downlink direction. Three different DCHs have been introduced: CDCH (Control-plane DCH), UDCH (User-plane DCH) and ADCH (Associated DCH), the CDCH and UDCH of which used for transmission of RLC/MAC data transfer blocks, whereas the ADCH targeted for transmission of RLC/MAC control blocks. A mobile station may concurrently have a plurality of transport channels active.

The FLO architecture is illustrated in FIG. 3 especially in relation to Layer 1 for FLO. In this version only a one-step interleaving has been assumed, i.e. all transport channels on one basic physical subchannel have the same interleaving depth. An alternative architecture with two-step interleaving is disclosed in 3GPP TR 45.902 V6.4.0 Technical Specification Group GSM/EDGE, Radio Access Network; Flexible Layer One (Rel 6) for review. Basic error detection is carried out with a cyclic redundancy check. A Transport Block is inputted to error detection 302 that utilizes a selected generator polynomial in order to calculate the checksum to be attached to the block. Next, the updated block called Code Block is fed into a convolutional channel coder 304 introducing additional redundancy to it. In rate matching 306 bits of an Encoded Block are either repeated or punctured. As the block size can vary, also the number of bits on a transport channel may correspondingly fluctuate. Thereupon, bits shall be repeated or punctured in order to keep the overall bit rate in line with the actual allocated bit rate of the corresponding sub-channel. Output from rate matching block 306 is a called a Radio Frame. Transport channel multiplexing 308 takes care of multiplexing of Radio Frames from active transport channels TrCH(i) . . . TrCH(I) received from matching block 306 into a CCTrCH (Coded Composite Transport Channel). In TFCI mapping 310 a TFCI is constructed for the CCTrCH. The size of the TFCI depends on the number of TFCs needed. The size should be minimized in order to avoid unnecessary overhead over the air interface. For example, a TFCI of 3 bits can indicate 8 different transport format combinations. If these are not enough, a dynamic connection reconfiguration is needed to be performed. The TFCI is (block) coded and then interleaved 312 with CCTrCH (these two constituting a Radio Packet) on bursts. The selected interleaving technique is configured at call set-up RRC layer, Layer 3 for FLO, manages set-up, reconfiguration and release of the traffic channels. Upon creating a new connection, Layer 3 indicates to the lower layers various parameters to configure the physical, MAC and RLC layers. Parameters include the transport channel identity (TrCH Id) and transport format set for each transport channel, transport format combination set through CTFC with modulation parameter etc. In addition, Layer 3 provides transport channel specific parameters such as CRC size, rate matching parameters, transport format dynamic attributes etc. The transport channels and the transport format combination set are separately configurable in the uplink and downlink directions by utilizing e.g. Radio Bearer procedures disclosed in sections 7.14.1 and 7.19 of 3GPP TS 44.118 V6.1.0 Technical Specification Group GSM/EDGE, Radio Access Network; Mobile radio interface layer 3 specification; Radio Resource Control (RRC) protocol Iu Mode (Rel 6) in more detail.

Furthermore, Layer 3 may include information about transport format combination subset(s) to further restrict the use of transport format combinations within the TFCS. Such information may be formed via a "minimum allowed transport format combination index", an "allowed transport format combination list", a "non-allowed transport formation combination list" etc.

Clearly also incremental TFCS reconfiguration should be possible in FLO, i.e. information only about transport channels or TFCs that are added, modified or deleted could be signalled by e.g. modified Radio Bearer signalling. After various reconfigurations, the overall configuration should still be consistent, which could be assured by, for example, removing all TFCs from the TFCS that utilize a transport channel to be released.

In addition to mere payload data also signalling information is transferred by utilizing the FLO concept. The transmission of signalling data must be made especially secure as the error scenarios arising from partially corrupted or completely lost signalling messages may even corrupt the whole connection if necessary corrective actions are not taken. Thus both the control plane and RLC/MAC level control messages shall be transferred with sufficient protection; FLO concept for it's part enables flexible and dynamic allocation and tuning of transfer resources, therefore the protection for signalling may be changed and the signalling even be multiplexed with outer radio bearers. In GSM, CS1 coding has been traditionally used for the protection of signalling. Flexibility offered by the FLO shall, however, not be utilized in the case of control plane information transfer as it could lead to inconsistent performance throughout the network. Meanwhile, the transfer parameters for signalling information shall be kept fixed and in the case of full rate channels, the first TFC with TFCI=0 is allocated solely for signalling transfer with only one active transport channel with 184 bit transport blocks and 18 bit CRC.

In order to guarantee seamless handovers between full rate and half rate channels the link level performance of associated signalling must be similar for the two different channel usage modes. Accordingly, the coding rate of associated signalling on half rate (HR) channels must be equal to the coding rate of associated signalling on full rate (FR) channels. In GSM/EDGE the interleaving depth of FACCH (Fast Associated Control Channel) is increased on half rate channels: it's twice the interleaving depth of TCH/H. As a result the performance of FACCH/H is very similar to the performance of FACCH/F; see 3GPP TS 45.003 V6.2.0 Technical Specification Group GSM/EDGE, Radio Access Network; Channel coding (Rel 6).

However, with the one step interleaving architecture, all TrCHs on one basic physical subchannel have the same interleaving depth, and the MAC layer shall send the same transport block twice in a row instead of the above traditional solution. Since coded bits of the same transport block can be found in two consecutive radio packets, the effect is as if the interleaving depth was twice the interleaving used for one radio packet. Two TFCs are defined for sending signalling messages: one is used for the first transmission and the other for the second transmission. For the transport formats used on the transport channel for signalling, an additional dynamic transport format attribute is required for HR channels. Layer 3 configures the two TFCs such that, in rate matching, the attribute, parameter R, shall be equal to 0 for the first transmission (first radio packet) and equal to 1 for the retransmission (second radio packet); 3GPP TR 45.902 V6.4.0 Technical Specification Group GSM/EDGE, Radio Access Network; Flexible layer One (Rel 6) discloses further information about the rate matching algorithm. Therefore, two TFCIs with TFCI=0 and TFCI=1 are defined for signalling messages on HR channels, each corresponding to one of the two transport formats above. The receiver is able to determine whether it is a question about receiving the first or the second transmission of a signalling block (and therefore apply the appropriate decoding procedures) through the value of the TFCI. The aforesaid two TFCs shall be configured as in the case of full rate channels, but the transport formats shall have a different value of the retransmission number parameter R.

Regardless of the above somewhat feasible solution for providing consistent signalling transfer in different network scenarios and conditions, a number of problems arise especially during a handover between full rate and half rate channels. First, the old TFCS cannot be utilized as such and the TFCS reconfiguration process is an inevitable consequence thereof. Secondly, if the TFCS has been previously configured to reserve all the possible TFCs, i.e. the TFCI space is in full use, moving to an HR channel would require adding at least one more bit to the TFCI if possible, rejecting the handover request, or removing one user data TFC in order to provide an additional one for signalling purposes.

SUMMARY OF THE INVENTION

The object of the present invention is to alleviate the effect of the aforesaid defect in FR⇌HR transitions causing either TFCS reconfiguration, deletion of existing TFCs, or even abortion of the whole transition procedure in a system utilizing the FLO physical layer. Another object of the invention is to reduce the number of TFCs required for signalling on HR channels.

The object is achieved by aligning the values of parameter R determining the retransmission number with the TDMA frame structure, e.g. with frame numbers, during a multiframe comprising a plurality (e.g. 26) frames. The value of R to be used for encoding/decoding data in radio packets can be then determined on the basis of a preferred rule related to the underlying existing TDMA frame structure.

The utility of the invention is based on a plurality of issues. As the most obvious one, the value of R does not need to be signalled. Further, as it does not form a part of a transport format anymore, only one TFC is needed for HR channels instead of two TFCs as with the prior art solution. Still further, the very same TFCS can be used on both FR and HR channels. Due to the time alignment of a receiver with a corresponding transmitter, the receiver is aware of the current value of parameter R, and by taking the interleaving and transmission delay into account, it can deduct the proper R value for a received packet with. TFCI indicating signalling information embedded therein. The core idea of the invention may be generalized and utilized in other systems as well in addition to the GERAN/FLO used herein to mainly concretise the general inventive concept.

According to the invention, a method for transmitting signalling information in a TDMA based wireless communications system adapted to transfer data in radio packets over the air interface thereof, a number of transport blocks included in a radio packet, is characterized in that it has the steps of
    determining the temporal alignment of values for a retransmission number parameter (R) with the TDMA frame structure, said retransmission number parameter used for encoding data in a radio packet,
    transmitting in a number of first TDMA frames a first radio packet including a transport block of signalling information encoded by utilizing a first retransmission number parameter value obtained on the basis of the temporal alignment information, and
    transmitting in a number of second TDMA frames, said second TDMA frames at least partly differing from said first TDMA frames, at least a second, consecutive radio packet including a transport block of signalling information encoded by utilizing a second retransmission number parameter value obtained on the basis of the temporal alignment information.

In another aspect of the invention, a method for receiving signalling information in a TDMA based wireless communications system adapted to transfer data in radio packets over the air interface thereof, a number of transport blocks included in a radio packet, is characterized in that it has the steps of
    determining the temporal alignment of values for a retransmission number parameter (R) with the TDMA frame structure, said retransmission number parameter used for encoding data in a radio packet,
    receiving in a number of first TDMA frames a first radio packet including a transport block of signalling information encoded by utilizing a first retransmission number parameter value obtained on the basis of the temporal alignment information,
    receiving in a number of second TDMA frames, said second TDMA frames at least partly differing from said first TDMA frames, at least a second, consecutive radio packet including a transport block of signalling information encoded by utilizing a second retransmission number parameter value obtained on the basis of the temporal alignment information, and
    decoding the received first radio packet by utilizing said first retransmission number parameter value and the received second radio packet by utilizing said second retransmission number parameter value.

In a further aspect of the invention, a device operable in a TDMA based wireless communications system adapted to transmit data in radio packets including a number of transport blocks, said device comprising processing means and memory means configured to process and store instructions and data, and data transfer means configured to transfer data, is characterized in that it is adapted to
    determine the temporal alignment of values for a retransmission number parameter (R) with the TDMA frame structure, said retransmission number parameter used for encoding data in a radio packet,
    transmit in a number of first TDMA frames a first radio packet including a transport block of signalling information encoded by utilizing a first retransmission number parameter value obtained on the basis of the temporal alignment information, and transmit in a number of second TDMA frames, said second TDMA frames at least partly differing from said first TDMA frames, at least a second, consecutive radio packet including a transport block of signalling information encoded by utilizing a second retransmission number parameter value obtained on the basis of the temporal alignment information.

Yet in a further aspect, a device operable in a TDMA based wireless communications system adapted to receive data in radio packets including a number of transport blocks, said device comprising processing means and memory means configured to process and store instructions and data, and data transfer means configured to transfer data, is characterized in that it is adapted to determine the temporal alignment of values for a retransmission number parameter (R) with the TDMA frame structure, said retransmission number parameter used for encoding data in a radio packet, receive in a number of first TDMA frames a first radio packet including a transport block of signalling information encoded by utilizing a first retransmission number parameter value obtained on the basis of the temporal alignment information, receive in a number of second TDMA frames, said second TDMA frames at least partly differing from said first TDMA frames, at least a second, consecutive radio packet including a transport block of signalling information encoded by utilizing a second retransmission number parameter value obtained on the basis of the temporal alignment information, and decode the received first radio packet by utilizing said first retransmission number parameter value and the received second radio packet by utilizing said second retransmission number parameter value.

The above term "determining" refers herein to checking the current rules for establishing retransmission number parameter values in relation to the TDMA structure based on e.g. mapping between certain TDMA frame numbers and certain parameter values. The determination phase may in practise be implemented in a transmitting or receiving device by, for example, reading and analysing, and optionally updating, a number of variables/parameters defining the ruling, such variables/parameters stored in and retrievable from a device memory or received from external devices. The determination phase does not however require any change to take place in the already existing mappings.

The term "data" generally refers to signalling and/or payload type data.

In one embodiment of the invention, a network element transmits signalling information in accordance with the invention to a wireless communications device. Both the network element and the wireless communications device utilize the common rules for temporal alignment of retransmission number parameter values in relation to the underlying TDMA structure and thus encode/decode the radio packets with signalling information in a mutually compatible manner.

Dependent claims disclose embodiments of the invention.

BRIEF DESCRIPTION OF THE DRAWINGS

Hereinafter the invention is described in more detail by reference to the attached drawings, wherein FIG. 1 discloses a visualization of a TFCS structure.

FIG. 4C further depicts the scenario of FIG. 4B for transferring signalling information by utilizing TDMA frame structure as a reference for determining the proper R parameter values.

DETAILED DESCRIPTION OF THE EMBODIMENT OF THE INVENTION

Figure 1:
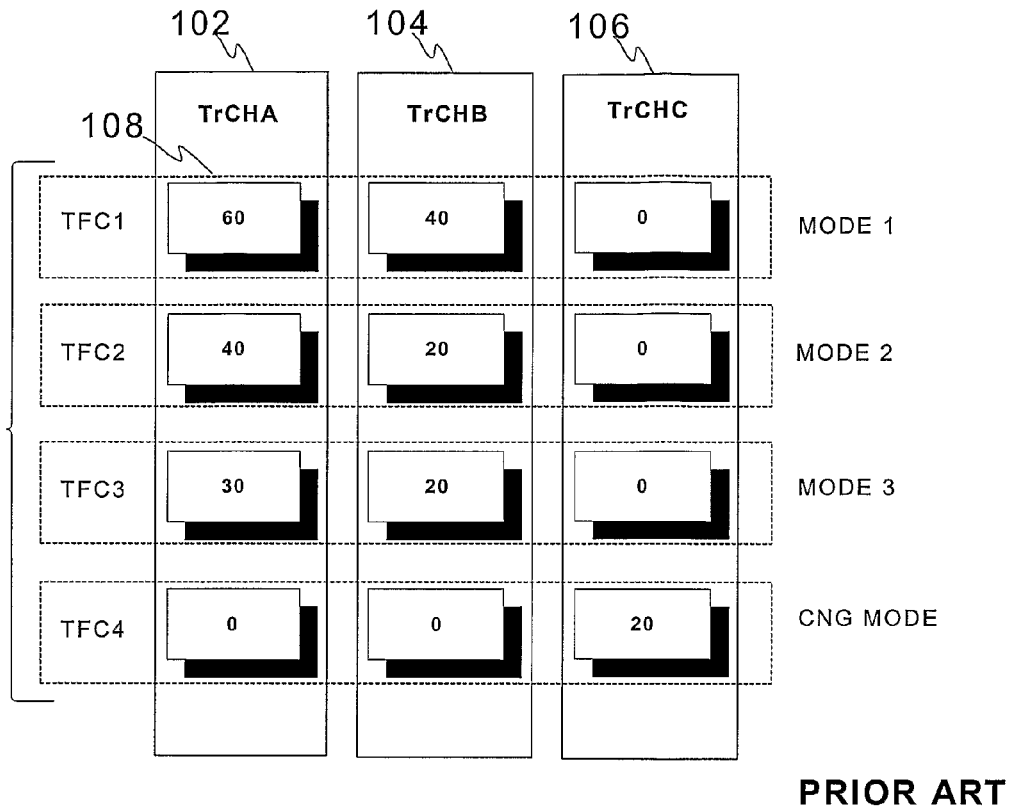
Figure 2:
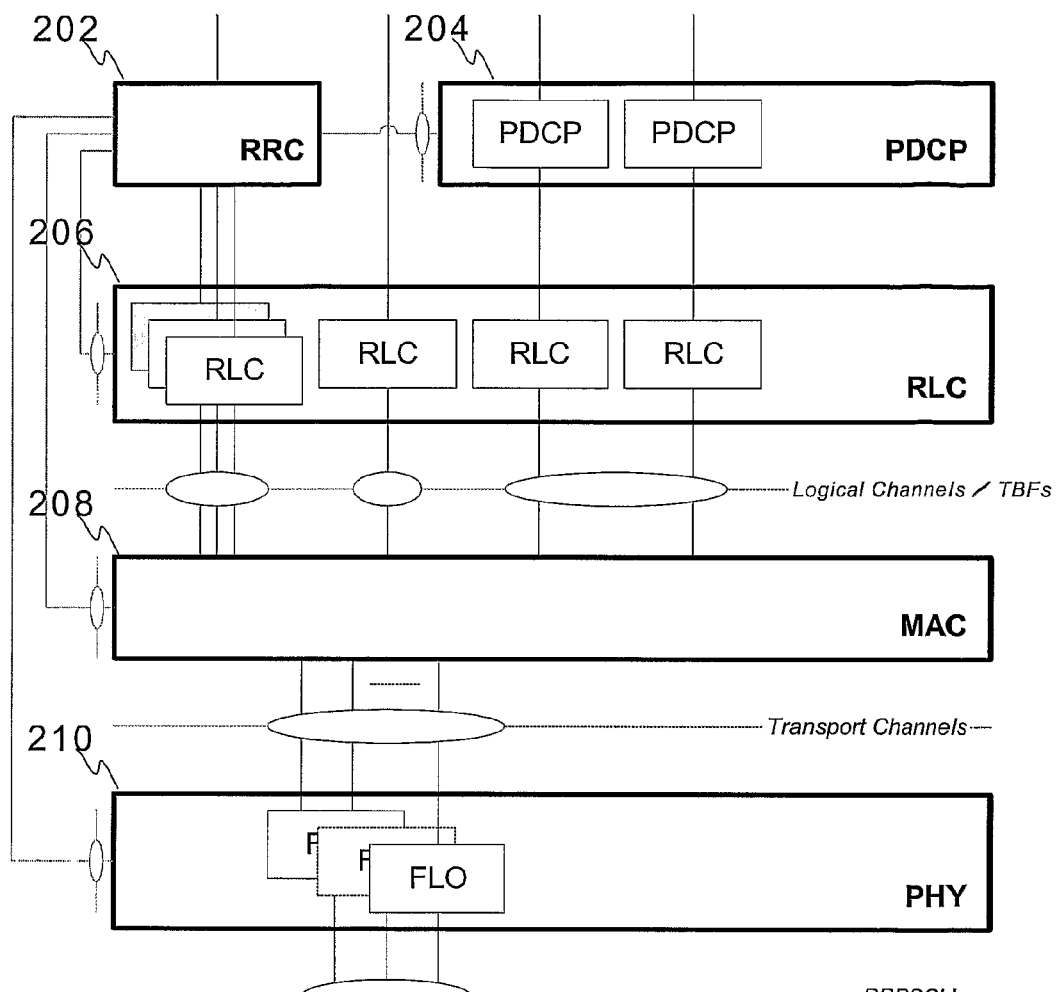
FIG. 2 illustrates FLO protocol architecture in GERAN Iu mode.
Figure 3:
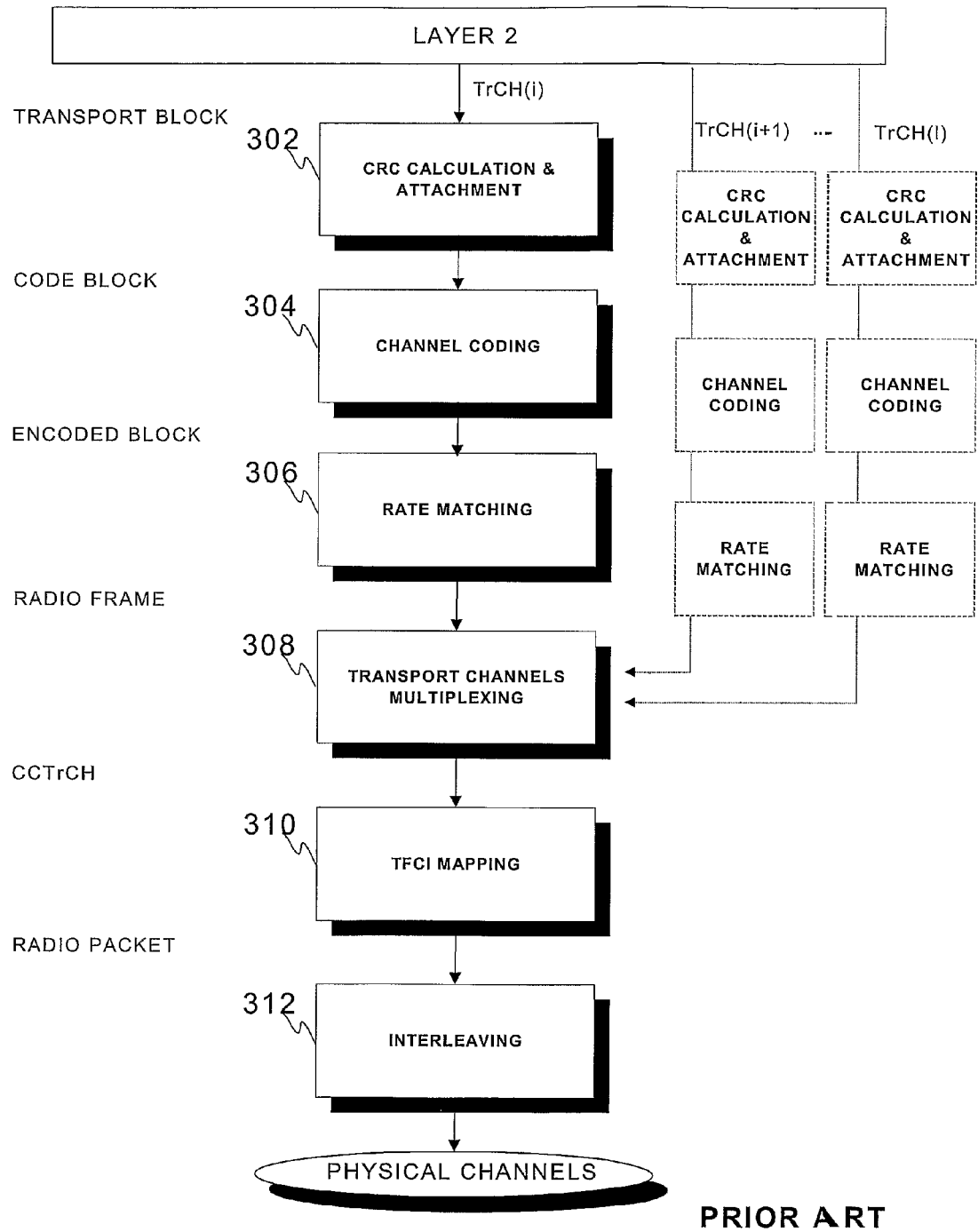
FIG. 3 illustrates the FLO architecture.

FIGS. 1, 2, and 3 were already discussed in conjunction with the description of related prior art.

Figure 4A:
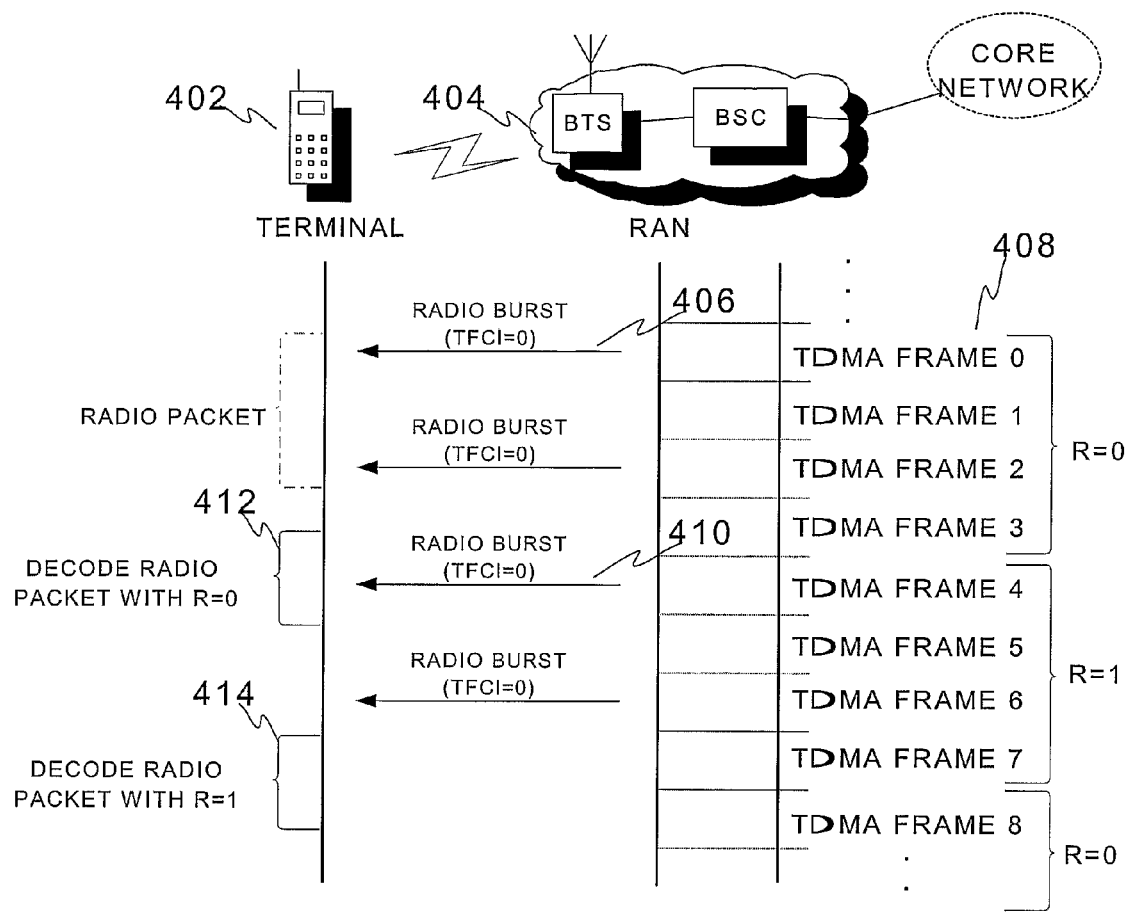
FIG. 4A is a signalling chart of an embodiment of the invention.

FIG. 4A discloses, by way of example only, a signalling chart describing the scenario of one embodiment of the invention in which a wireless communications device such as mobile terminal 402 receives radio packets from network side 404 on a HR channel (only half of the TDMA frames are used for the connection as can be seen from the figure) such as a radio access network connected to a core network. The element sending the packets at the network side may be e.g. a base station. In this example, two radio bursts 406 include the portions of a first radio packet, see dotted side brace, with signalling transport block embedded therein. The radio packets have been encoded by the network side using a retransmission number parameter R with value 0. The encoding of the packet internals may refer to e.g rate matching as mentioned hereinbefore. Values of parameter R have in this case been tied to the TDMA frame number of the first bits to be sent for each radio packet. Thus, as the first bits in the first burst have been sent during TDMA frame 0, frame number⇋R value mapping 408 has indicated to use value 0 for encoding the whole packet even the last half of the packet would have been sent in another TDMA frame with another R value correspondence, although that was not the case in the current scenario. After receiving both two bursts of the first radio packet, the receiving terminal decodes 412 it on the basis of TFCI indicating signalling TFC and proper R value deducted from the TDMA frame (number) during which the first half of the radio packet was transmitted. For encoding the consecutive, second radio packet with signalling transport block, network 404 utilizes value 1 for R as the transmission of the first burst containing a portion of the second radio packet occurs in TDMA frame 4 mapped to R value 1.

Accordingly, terminal 402 receives and decodes 414 the both bursts containing parts of the second radio packet on the basis of the TDMA frame number related to the transmission of the first bits of the packet. In this figure only two values have been allocated for use with R parameter, namely 0 and 1, but in theory also more than one retransmission of transport blocks with signalling information is possible and correspondingly, the mapping between TDMA frame structure and R values could be more versatile as described below. The transmission could also occur respectively in the opposite direction, just to be mentioned.

Considering a typical GSM multiframe with 26 frames, each of which corresponding to a 5 ms period, the value for parameter R could be defined as in following table 1.

TABLE 1

TDMA frame structure ↔ R value mappings

| TDMA frame number | Value of R |
|---|---|
| 0, 1, 2, 3 | 0 |
| 4, 5, 6, 7 | 1 |
| 8, 9, 10, 11 | 0 |
| 13, 14, 15, 16 | 1 |
| 17, 18, 19, 20 | 0 |
| 21, 22, 23, 24 | 1 |

One should remember that frames 12/25 are reserved for control/supervisory signals transmitted on the SACCH (Slow Associated Control Channel) and are thus not available for this purpose.

The value of R to be used by the encoder is given by the TDMA frame number of the first bits to be transmitted for that radio packet. For instance, if the first coded bits of the signalling radio packet are sent on TDMA frame 0, the value of R to be used by the encoder is 0. If the first coded bits are sent on TDMA frame 4, the value of R to be used is 1. Because radio packets correspond to a 20 ms period, one can easily check that two consecutive radio packets never use the same value of R. When bits are received, the decoder knows the TDMA frame number of the first bits that were transmitted and can therefore tell which value of R was used.

After all, the above example is simplified, as it does not contain, fox example, possible acknowledgments transmitted by terminal 402 to network side 404 as a response to the (properly) received packets. In addition, interleaving of radio packets, which typically slightly modifies the scenario, is not shown; see the scenario of FIG. 4B for further clarification.

For example, in the GSM system so-called diagonal interleaving is used for protecting the bits during transmission. A radio burst includes data from the previous radio packet as well in addition to the current packet. Now, if one burst is lost during the transmission due to e.g. temporary disturbances on the radio path, the receiver may at least estimate the contents thereof of the basis of surrounding bursts hopefully received without problems. As the transmitted data is typically convolutionally encoded, there exists useful inherent redundancy in it.

Due to the applied diagonal interleaving, one radio packet is now transmitted in four consecutive bursts each of which including portions of two consecutive radio packets as shown in the figure by reference sign 428. To refer an existing real-life situation with FLO and GERAN technologies, the bursts are transmitted on half rate channel number 0 pursuant to [3GPP TS 45.002 V6.5.0 Technical Specification Group GSM/EDGE, Radio Access Network; Multiplexing and multiple access on the radio path (Rel 6)], for example. The first radio packet carrying signalling is sent on TDMA frames numbered 0, 2, 4, 6 (R=0 was used for encoding) in bursts 422, 423, 424, and 425 whereas the second radio packet is sent on TDMA frames numbered 4, 6, 8, 10 (R=1 was used for encoding) in bursts 424, 425, 426, and 427. Thus, the outermost bursts 422, 423 and 426, 427 contain also some additional data being however not relevant from the invention's standpoint. After receiving the last coded bits of the first radio packet in TDMA frame 6, the receiver can decode 430 the first signalling radio packet, knowing exactly which value of R was used. Similarly, after receiving the last coded bits of the second radio packet on TDMA frame 10, the receiver can decode 432 the second signalling radio packet with another value for R. Mutual ordering of packet portions within the bursts does not have a special meaning in the figure.

Figure 4B:
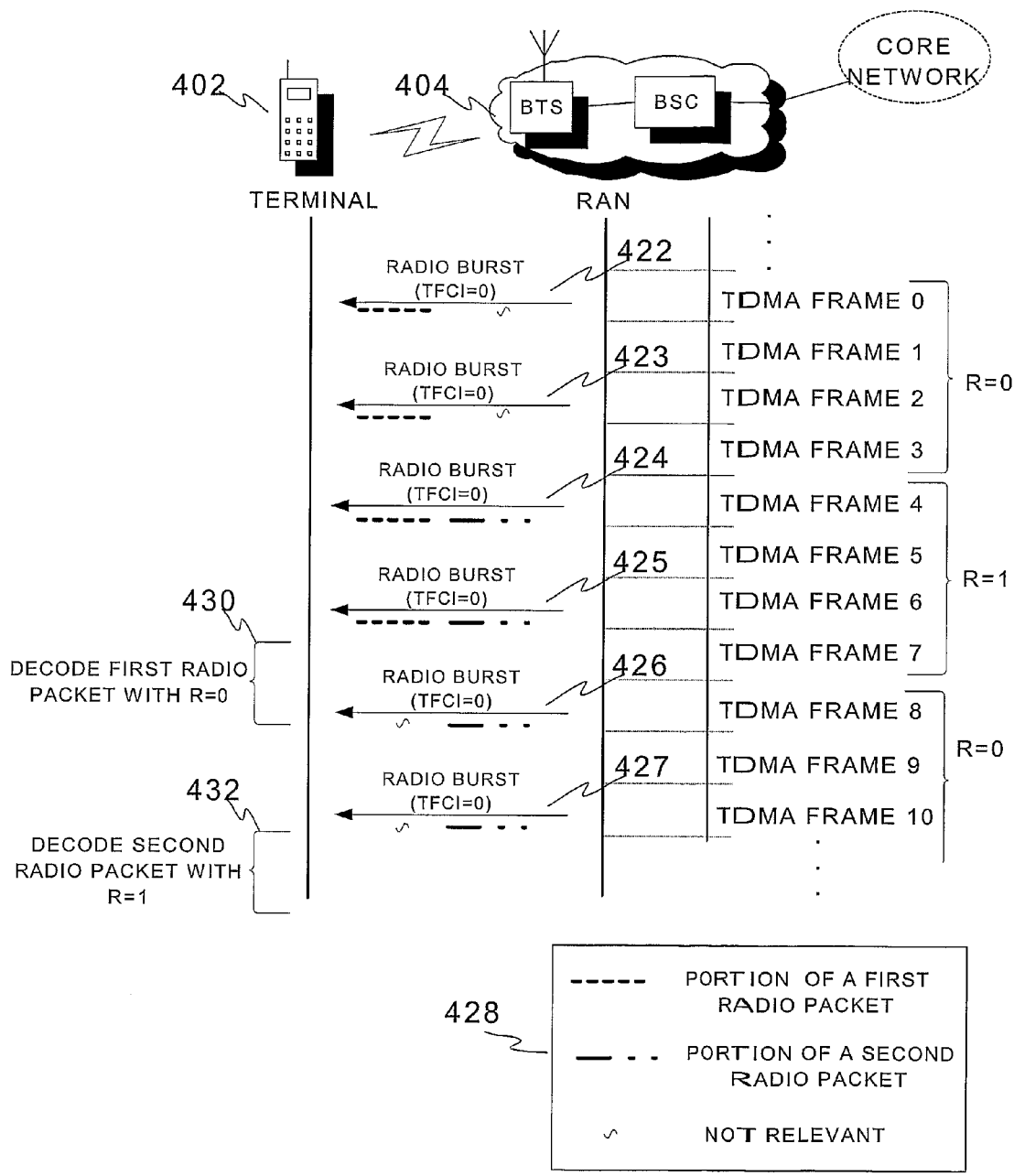
FIG. 4B is a modified signalling chart of an embodiment of the invention.

FIG. 4C discloses an alternative view to the scenario of FIG. 4B from GSM/GERAN standpoint. Exactly half of all the frames in a 26-frame multiframe are shown. A TDMA frame is basically sent every 4.616 ms (L1) corresponding to a period of 5 ms (L2). Two half-rate channels with temporal separation are shown in the figure (H#0 and H#0) with frames allocated thereto. In this case channel 0 is selected for transmission. Values of parameter R change every four frames, and thus the consecutive packets always utilize different R values due to the predetermined and cleverly constructed TDMA frame structure⇔R value mappings. Basic physical subchannel/time slots within TDMA frames are not depicted in the figure for clarity. X denotes irrelevant data while reference numerals 1 and 2 refer to corresponding first and second packets (or packet portions to be exact) in the radio bursts on two rows describing the transmission of bursts (H#0 transmit).

Additionally if more than two values of R parameter are needed, the alignment rule can easily be extended as presented in table 2 where Rmax refers to the maximum number of retransmissions allowed:

TABLE 2

TDMA frame structure <-> R value mappings
($R = \{0, 1, \ldots, R_{max} - 1\}$)

| TDMA frame number | Value of R |
|---|---|
| 0, 1, 2, 3 | 0 mod $R_{max}$ |
| 4, 5, 6, 7 | 1 mod $R_{max}$ |
| 8, 9, 10, 11 | 2 mod $R_{max}$ |
| 13, 14, 15, 16 | 3 mod $R_{max}$ |
| 17, 18, 19, 20 | 4 mod $R_{max}$ |
| 21, 22, 23, 24 | 5 mod $R_{max}$ |

Further supplementary or alternative alignment rules are, of course, possible as long as both transmission ends know and use the same rule: for instance, the value of R to be used by the encoder is given by the TDMA frame number of the first bits to be received.

Figure 5:
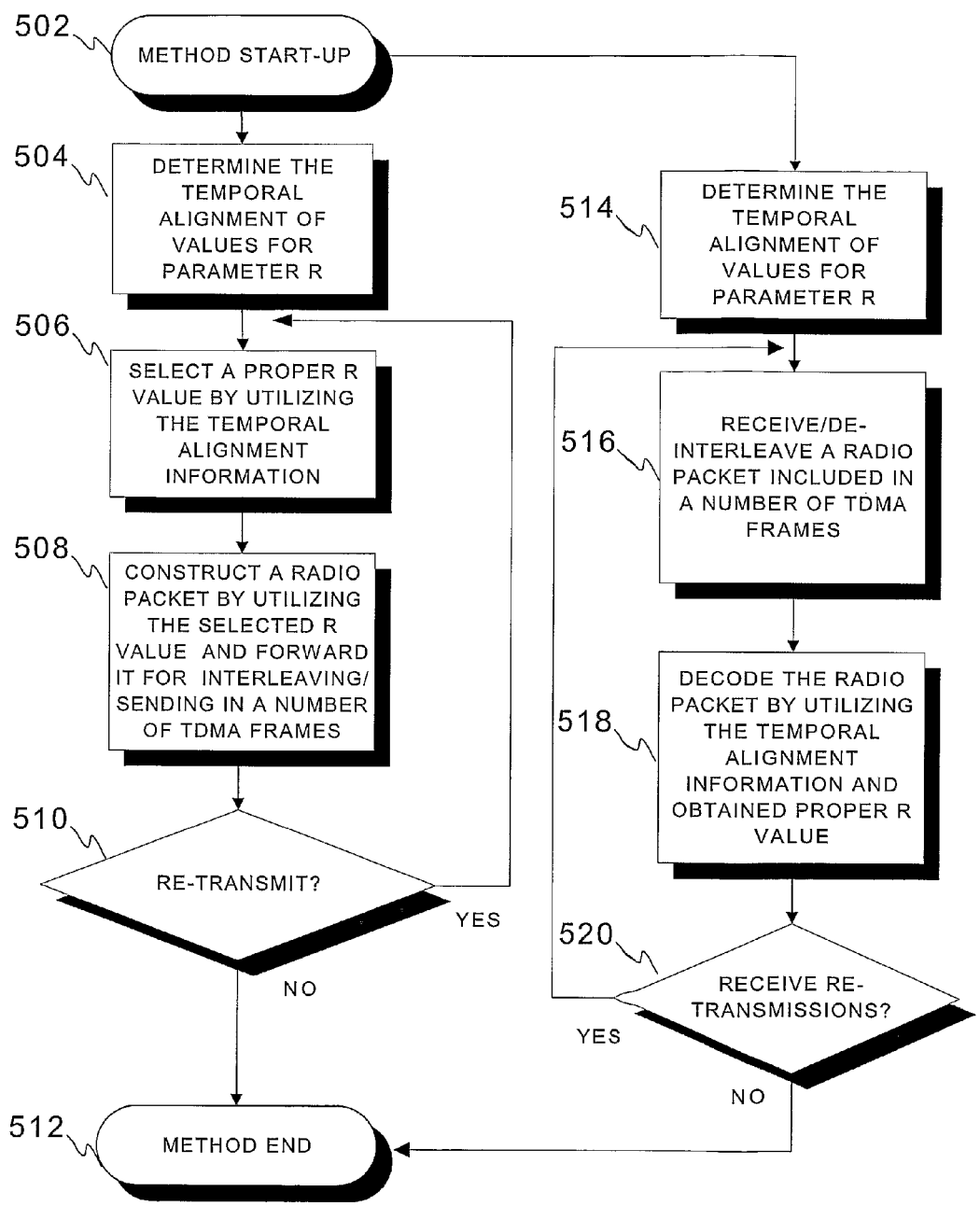
FIG. 5 discloses a flow diagram of the method of the invention.

FIG. 5 discloses a flow diagram of the method of the invention. The path on the left represents the actions taken at the sending end whereas the path on the right refers to the receiving side. At method start-up 502 a device, by referring to a network entity (e.g. a base station) or to a wireless communications device like a mobile terminal may, for example, load the software performing the method of the invention to the memory thereof and start execution. In addition, necessary memory areas can be initialised and communication connections established. Respectively, a need for sending/receiving signalling information is established to trigger the further execution of the method.

In step 504 the device determines by, for example, retrieving a number of variables/parameters stored in the memory and analysing them according to a programmed logic (e.g. Tables 1 and 2) the current temporal alignment of values for parameter R with the TDMA frame structure like TDMA frame numbers. It is also possible to receive new alignment rules from external sources, e.g. BSC or even the far-end device, dynamically.

In step 506 the sending device selects a proper value of R for encoding, by which it is referred to, for example, rate matching, radio packet internals including the transfer block with signalling information. The selection is based on the available information, see previous step 504, about the TDMA⇔R frame structure alignment rules. For example, TDMA frame number of the first bits of the signalling radio packet to be sent can be used to define the proper value for R if such a simple mapping is preferred over more complex ones. In step 508 the radio packet is constructed normally depending on the system, e.g. according to the FLO architecture represented by FIG. 3, and using a proper value for R. Construction stage may include interleaving step already described above with necessary buffering in order to combine subsequent packets' data etc. In phase 510 it is checked whether a re-transmission is needed based on the number of different R values and if that's the case, steps 506 and 508 are repeated until no more retransmissions are left to be sent. The flow diagram does not contain any optional information exchange between the sending and receiving devices, although e.g. acknowledgement messages may be transferred during the execution of the method. The method is ended in step 512.

At the receiver, in step 514 the alignment rules for parameter R are respectively determined to properly decode the incoming signalling information. In step 516 a radio packet with signalling data is received and in step 518 decoded according to a proper R value. Receipt of radio packets is continued 520 if more of them should be on the way according to the current number of retransmissions used. The method is ended in step 512.

It's obvious to a person skilled in the art that the steps presented in FIG. 5 can be modified in order to match the desired use case in a best possible way. For example determination steps 504 and 514 may be embedded into R value definition 506 and packet decoding 518 steps if preferred as long as proper R value for a radio packet is solved before using any guesstimate for encoding/decoding it. Correspondingly, step of decoding radio packet(s) 518 may be performed after receiving a plurality of them, not necessarily after each packet (one at a time).

Figure 6:
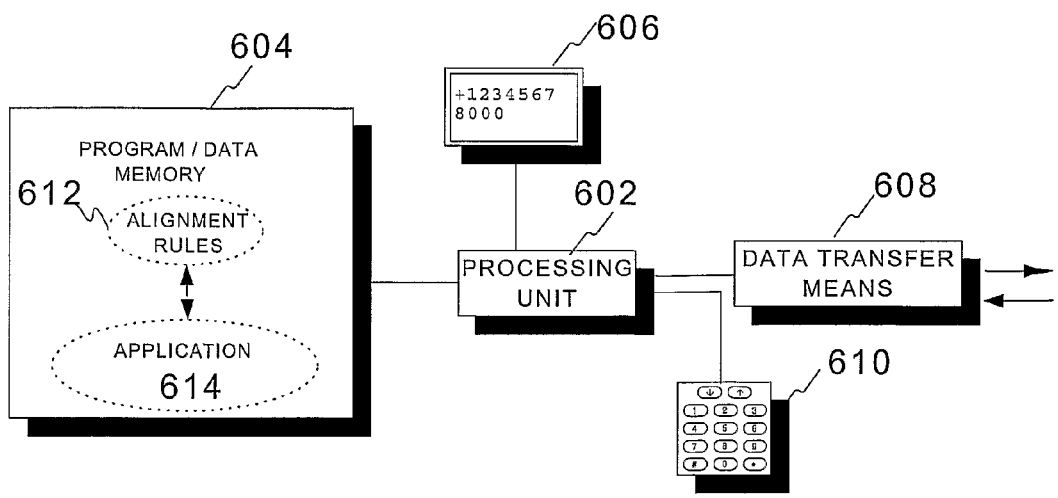
FIG. 6 discloses a block diagram of a device adapted to utilize the invention.

FIG. 6 depicts one option for basic components of a device like a network element, e.g. base station (or a combination of separate elements), or a mobile terminal capable of processing and transferring data in accordance with the invention. Wording "mobile terminal" refers to, in addition to contemporary cellular phones, also to more sophisticated multimedia terminals, hand held and laptop computers etc capable of wireless communication. Memory 604, divided between one or more physical memory chips, comprises necessary code 614, e.g. in a form of a computer program/application, and configuration (TDMA frame structure⇔R value relationships) data 612. Processing unit 602 is required for the actual execution of the method in accordance with instructions in code 614. Display 606 and keypad 610 are optional components often found useful for providing necessary device control and data visualization means (~user interface) to the user of the device. Data transfer means 608, e.g. a radio transceiver, are required for handling data exchange, for example, receipt of configuration data from other devices and/or transmission/receipt of signalling data to/from other devices. Code 614 for the execution of the proposed method can be stored and delivered on a carrier medium like a floppy, a CD or a memory card.

The scope of the invention can be found in the following claims. However, utilized devices, method steps, data structures etc may vary depending on the current scenario, still converging to the basic ideas of this invention. The invention was described by keeping especially GERAN/FLO concept in mind but the overall concept could be utilized in other systems bearing the TDMA nature as well.

The invention claimed is:

1. A method comprising:
   determining a temporal alignment of values for a retransmission number parameter with a time division multiple access frame structure by checking a mapping between time division multiple access frame numbers and values of the retransmission number parameter, said retransmission number parameter used for encoding data in a radio packet,
   transmitting in a number of first time division multiple access frames a first radio packet comprising a transport block of signaling information encoded by utilizing a first retransmission number parameter value obtained on the basis of the temporal alignment value, and
   transmitting in a number of second time division multiple access frames, said second time division multiple access frames differing from said first time division multiple access frames, at least a second radio packet comprising a transport block of signaling information encoded by utilizing a second retransmission number parameter value obtained on the basis of the temporal alignment value.

2. The method of claim 1, wherein said first and second time division multiple access frames are transmitted on half-rate channels.

3. The method of claim 1, wherein a system utilizes a flexible layer one for data transfer.

4. The method of claim 1, wherein a system utilizes a GSM/EDGE radio access network.

5. The method of claim 1, wherein a number of frames have been associated with retransmission number parameter value 0 and a number of frames with retransmission number parameter value 1.

6. The method of claim 5, wherein the mapping for a multiframe comprising 26 frames indicates value 0 for the retransmission number parameter in the case of frames numbered 0, 1, 2, 3, 8, 9, 10, 11, 17, 18, 19, 20, and value 1 in the case of frames numbered 4, 5, 6, 7, 13, 14, 15, 16, 21, 22, 23, 24, while the multiframe comprises frames numbered from 0 to 25.

7. The method of claim 1, wherein the mapping for a multiframe comprises division of frames in the multiframe into a plurality of frame groups each of which comprising a number of consequent frames, and associating each group with a certain retransmission number parameter value.

8. The method of claim 7, wherein the groups have equal number of frames included.

9. The method of claim 1, wherein one radio packet is transmitted in four radio bursts, each burst comprising a data portion from at least two radio packets.

10. The method of claim 1, wherein rules for the temporal alignment are received from or transmitted to another device by a device performing the method.

11. A method comprising:
   determining a temporal alignment of values for a retransmission number parameter with a time division multiple access frame structure by checking a mapping between time division multiple access frame numbers and values of the retransmission number parameter, said retransmission number parameter used for encoding data in a radio packet,
   receiving in a number of first time division multiple access frames a first radio packet comprising a transport block of signaling information encoded by utilizing a first retransmission number parameter value obtained on the basis of the temporal alignment value, receiving in a number of second time division multiple access frames, said second time division multiple access frames differing from said first time division multiple access frames, at least a second radio packet comprising a transport block of signalling information encoded by utilizing a second retransmission number parameter value obtained on the basis of the temporal alignment value, and decoding the received first radio packet by utilizing said first retransmission number parameter value and the received second radio packet by utilizing said second retransmission number parameter value.

12. The method of claim 11, wherein said first and second time division multiple access frames are received on half-rate channels.

13. The method of claim 11, wherein a system utilizes a flexible layer one for data transfer.

14. The method of claim 11, wherein a system utilizes a GSM/EDGE radio access network.

15. The method of claim 11, wherein a number of frames have been associated with a retransmission number parameter value 0 and a number of frames with a retransmission number parameter value 1.

16. The method of claim 11, wherein one radio packet is transmitted in four radio bursts, each burst comprising a data portion from at least two radio packets.

17. The method of claim 11, wherein rules for the temporal alignment are received from or transmitted to another device by a device performing the method.

18. An apparatus comprising:
at least one processor and
at least one memory comprising a computer program code,
the at least one memory and the computer program code configured to, with the at least one processor, cause the apparatus to perform at least the following:
determine a temporal alignment of values for a retransmission number parameter with a time division multiple access frame structure by checking a mapping between time division multiple access frame numbers and values of the retransmission number parameter, said retransmission number parameter used for encoding data in a radio packet,
transmit in a number of first time division multiple access frames a first radio packet comprising a transport block of signaling information encoded by utilizing a first retransmission number parameter value obtained on the basis of the temporal alignment value, and
transmit in a number of second time division multiple access frames, said second time division multiple access frames differing from said first time division multiple access frames, at least a second radio packet comprising a transport block of signaling information encoded by utilizing a second retransmission number parameter value obtained on the basis of the temporal alignment value.

19. The apparatus of claim 18, wherein said first and second time division multiple access frames are configured to be transmitted on half-rate channels.

20. The apparatus of claim 18, wherein a system is configured to utilize a flexible layer one for data transfer.

21. The apparatus of claim 18, wherein a system is configured to utilize a GSM/EDGE radio access network.

22. The apparatus of claim 18, wherein a number of frames have been associated with retransmission number parameter value 0 and a number of frames with retransmission number parameter value 1.

23. The apparatus of claim 18, wherein the mapping for a multiframe comprising 26 frames indicates value 0 for the retransmission number parameter in the case of frames numbered 0, 1, 2, 3, 8, 9, 10, 11, 17, 18, 19, 20, and value 1 in the case of frames numbered 4, 5, 6, 7, 13, 14, 15, 16, 21, 22, 23, 24, while the multiframe comprises frames numbered from 0 to 25.

24. The apparatus of claim 18, wherein the mapping for a multiframe comprises division of frames in the multiframe into a plurality of frame groups comprising a number of consequent frames and associating each group with a certain retransmission parameter value.

25. The apparatus of claim 24, wherein the groups have equal number of frames included.

26. The apparatus of claim 18, wherein the apparatus is further configured to perform at least the following: to transmit a radio packet in four radio bursts, each burst comprising data from at least two radio packets.

27. The apparatus of claim 18, wherein the apparatus is further configured to perform at least the following: to receive rules for the temporal alignment from another device or to transmit rules for the temporal alignment to another device.

28. The apparatus of claim 18, wherein the apparatus is a mobile terminal or a base station.

29. The apparatus of claim 18, wherein the apparatus is a GSM terminal.

30. An apparatus comprising:
at least one processor and
at least one memory comprising a computer program code,
the at least one memory and the computer program code configured to, with the at least one processor, cause the apparatus to perform at least the following:
determine a temporal alignment of values for a retransmission number parameter with a time division multiple access frame structure by checking a mapping between time division multiple access frame numbers and values of the retransmission number parameter, said retransmission number parameter used for encoding data in a radio packet,
receive in a number of first time division multiple access frames a first radio packet comprising a transport block of signaling information encoded by utilizing a first retransmission number parameter value obtained on the basis of the temporal alignment value,
receive in a number of second time division multiple access frames, said second time division multiple access frames differing from said first TDMA frames, at least a second radio packet comprising a transport block of signaling information encoded by utilizing a second retransmission number parameter value obtained on the basis of the temporal alignment value, and
decode the received first radio packet by utilizing said first retransmission number parameter value and the received second radio packet by utilizing said second retransmission number parameter value.

31. The apparatus of claim 30, wherein the apparatus is a mobile terminal or a base station.

32. The apparatus of claim 30, wherein the apparatus is operable in a GSM/EDGE radio access network.

33. A non-transitory computer readable medium comprising a computer executable program configured to execute, when the computer executable program is run in a computer, a method comprising:
determining a temporal alignment of values for a retransmission number parameter with a time division multiple access frame structure by checking a mapping between time division multiple access frame numbers and values of the retransmission number parameter, said retransmission number parameter used for encoding data in a radio packet, transmitting in a number of first time division multiple access frames a first radio packet comprising a transport block of signalling information encoded by utilizing a first retransmission number parameter value obtained on the basis of the temporal alignment value, and transmitting in a number of second time division multiple access frames, said second time division multiple access frames differing from said first time division multiple access frames, at least a second radio packet comprising a transport block of signaling information encoded by utilizing a second retransmission number parameter value obtained on the basis of the temporal alignment value.

34. A non-transitory computer readable medium comprising a computer executable program configured to execute, when the computer executable program is run in a computer, a method comprising:

determining a temporal alignment of values for a retransmission number parameter with a time division multiple access frame structure by checking a mapping between time division multiple access frame numbers and values of the retransmission number parameter, said retransmission number parameter used for encoding data in a radio packet, receiving in a number of first time division multiple access frames a first radio packet comprising a transport block of signaling information encoded by utilizing a first retransmission number parameter value obtained on the basis of the temporal alignment value, receiving in a number of second time division multiple access frames, said second time division multiple access frames differing from said first time division multiple access frames, at least a second radio packet comprising a transport block of signaling information encoded by utilizing a second retransmission number parameter value obtained on the basis of the temporal alignment value, and decoding the received first radio packet by utilizing said first retransmission number parameter value and the received second radio packet by utilizing said second retransmission number parameter value.

* * * * *